United States Patent
Swiderski et al.

(10) Patent No.: US 9,829,341 B1
(45) Date of Patent: Nov. 28, 2017

(54) SYSTEM AND METHOD FOR PROVIDING FLIGHT CUES FOR THE NAVIGATION FUNCTION REQUIRED TIME OF ARRIVAL (RTA)

(75) Inventors: Frank J. Swiderski, Cedar Rapids, IA (US); Michael J. Krenz, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1556 days.

(21) Appl. No.: 12/215,294

(22) Filed: Jun. 26, 2008

(51) Int. Cl.
*G01C 23/00* (2006.01)

(52) U.S. Cl.
CPC .................. *G01C 23/00* (2013.01)

(58) Field of Classification Search
CPC ...... G01C 23/00; G01C 23/005; G08G 5/003; G08G 5/0039; G08G 5/0047; G05D 1/0676; G05D 1/101
USPC ............ 701/204, 14, 120; 340/973, 978
See application file for complete search history.

(56) References Cited

U.S. PATENT DOCUMENTS

| | | | | |
|---|---|---|---|---|
| 4,774,670 A * | 9/1988 | Palmieri | ............................ | 701/3 |
| 5,121,325 A * | 6/1992 | DeJonge | ............................ | 701/123 |
| 5,408,413 A * | 4/1995 | Gonser et al. | ............................ | 701/3 |
| 5,689,251 A * | 11/1997 | Houck | ............................ | G01C 5/06 340/969 |
| 6,061,612 A * | 5/2000 | Sainthuile et al. | ............................ | 701/7 |
| 6,112,141 A * | 8/2000 | Briffe et al. | ............................ | 701/14 |
| 6,266,610 B1 * | 7/2001 | Schultz et al. | ............................ | 701/528 |
| 6,507,782 B1 * | 1/2003 | Rumbo | ............................ | G05D 1/0202 244/182 |
| 6,571,155 B2 * | 5/2003 | Carriker et al. | ............................ | 701/3 |
| 6,690,299 B1 * | 2/2004 | Suiter | ............................ | G01C 23/005 340/973 |
| 6,879,887 B2 * | 4/2005 | Gaidelis, Jr. | ............................ | G01C 23/00 340/969 |
| 6,995,690 B1 * | 2/2006 | Chen | ............................ | G01C 23/00 340/961 |
| 7,026,956 B1 * | 4/2006 | Wenger et al. | ............................ | 340/971 |
| 7,205,907 B2 * | 4/2007 | Naimer | ............................ | G01C 23/00 340/973 |
| 7,321,318 B2 * | 1/2008 | Crane | ............................ | G01C 23/005 340/971 |
| 7,412,324 B1 * | 8/2008 | Bagge et al. | ............................ | 701/120 |
| 7,623,960 B2 * | 11/2009 | Wise et al. | ............................ | 701/204 |

(Continued)

*Primary Examiner* — F. Zeender
*Assistant Examiner* — Milena Racic
(74) *Attorney, Agent, or Firm* — Angel N. Gerdzhikov; Donna P. Suchy; Daniel M. Barbieri

(57) ABSTRACT

The present invention is a flight deck situational awareness system for displaying Required Time of Arrival (RTA) information for an aircraft. The system may include a memory configured for storing aircraft navigation information for the aircraft. The system may also include a processor. The processor may be configured for being communicatively coupled with the memory and may further be configured for receiving the aircraft navigation information stored in the memory. The processor may generate a depiction based upon the aircraft navigation information. The depiction may include a Required Time of Arrival (RTA) flight cue for the aircraft. The system may further include a display, which may be communicatively coupled with the processor. The display may receive the depiction from the processor and may display the depiction.

11 Claims, 11 Drawing Sheets

(56) References Cited

U.S. PATENT DOCUMENTS

| | | | | |
|---|---|---|---|---|
| 7,765,061 B1* | 7/2010 | Barber | G01C 23/00 |
| | | | 701/436 |
| 7,783,393 B2* | 8/2010 | Tucker | G01C 23/00 |
| | | | 340/945 |
| 7,797,102 B2* | 9/2010 | Fortier | G08G 5/0034 |
| | | | 340/971 |
| 7,848,877 B2* | 12/2010 | Goodman et al. | 701/120 |
| 7,904,231 B2* | 3/2011 | Haskara | F02D 35/023 |
| | | | 123/406.22 |
| 8,027,758 B2* | 9/2011 | Ferro | G01C 23/00 |
| | | | 244/183 |
| 8,386,097 B2* | 2/2013 | de Menorval et al. | 701/10 |
| 2003/0193408 A1* | 10/2003 | Brown | G08G 5/0086 |
| | | | 340/945 |
| 2003/0193411 A1* | 10/2003 | Price | G01C 23/005 |
| | | | 340/973 |
| 2004/0210355 A1* | 10/2004 | Gaidelis, Jr. | G01C 23/00 |
| | | | 701/4 |
| 2005/0283281 A1* | 12/2005 | Hartmann | G05D 1/0607 |
| | | | 701/4 |
| 2006/0265110 A1* | 11/2006 | Ferro | G01C 23/00 |
| | | | 701/3 |
| 2007/0001830 A1* | 1/2007 | Dagci | B60K 31/185 |
| | | | 340/438 |
| 2009/0125221 A1* | 5/2009 | Estkowski | G05D 1/104 |
| | | | 701/120 |
| 2009/0231163 A1* | 9/2009 | He | G01C 23/005 |
| | | | 340/946 |
| 2011/0208374 A1* | 8/2011 | Jayathirtha | G05D 1/0676 |
| | | | 701/5 |

* cited by examiner

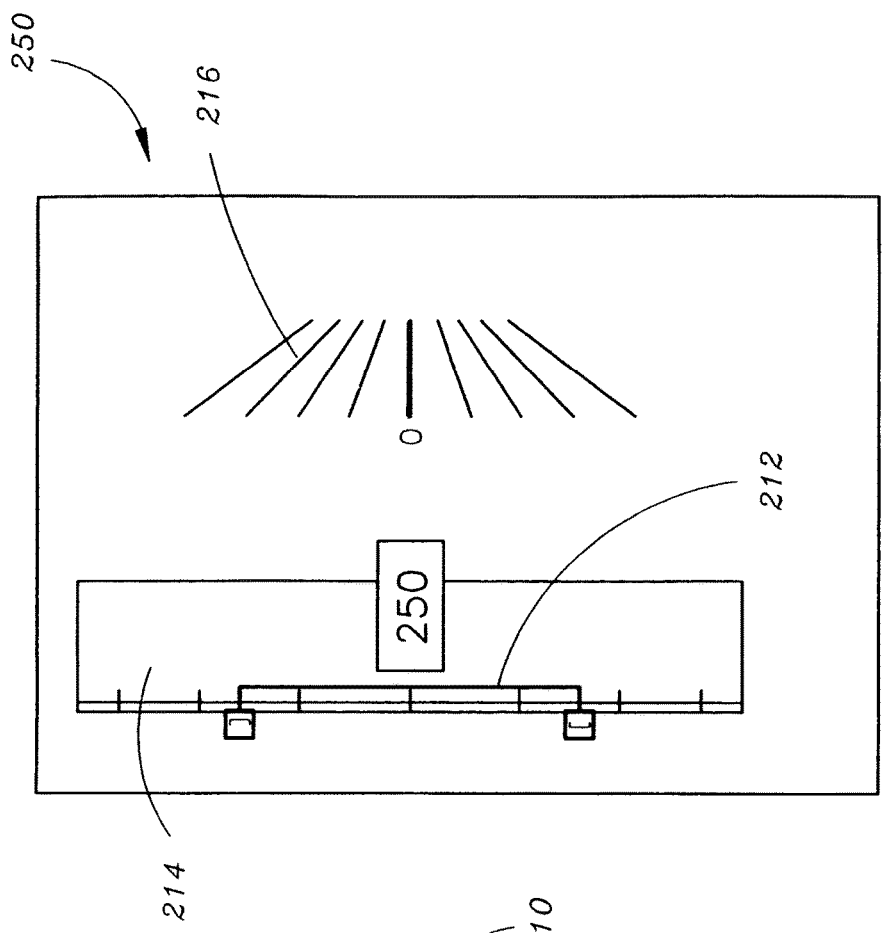
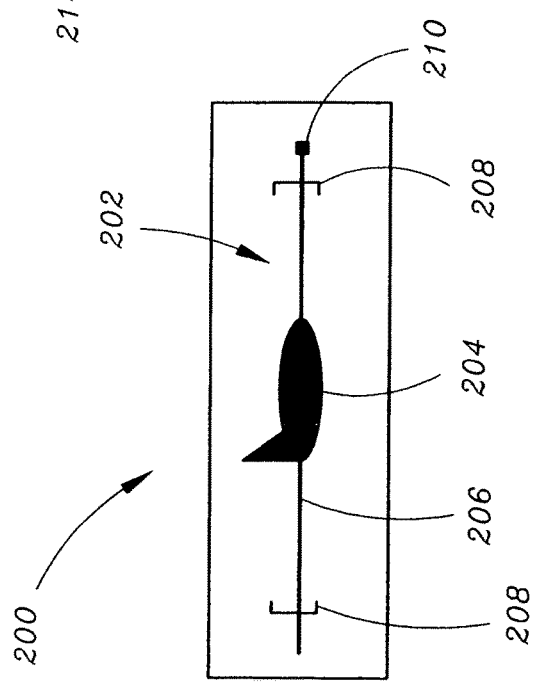
FIG. 2A
FIG. 2B

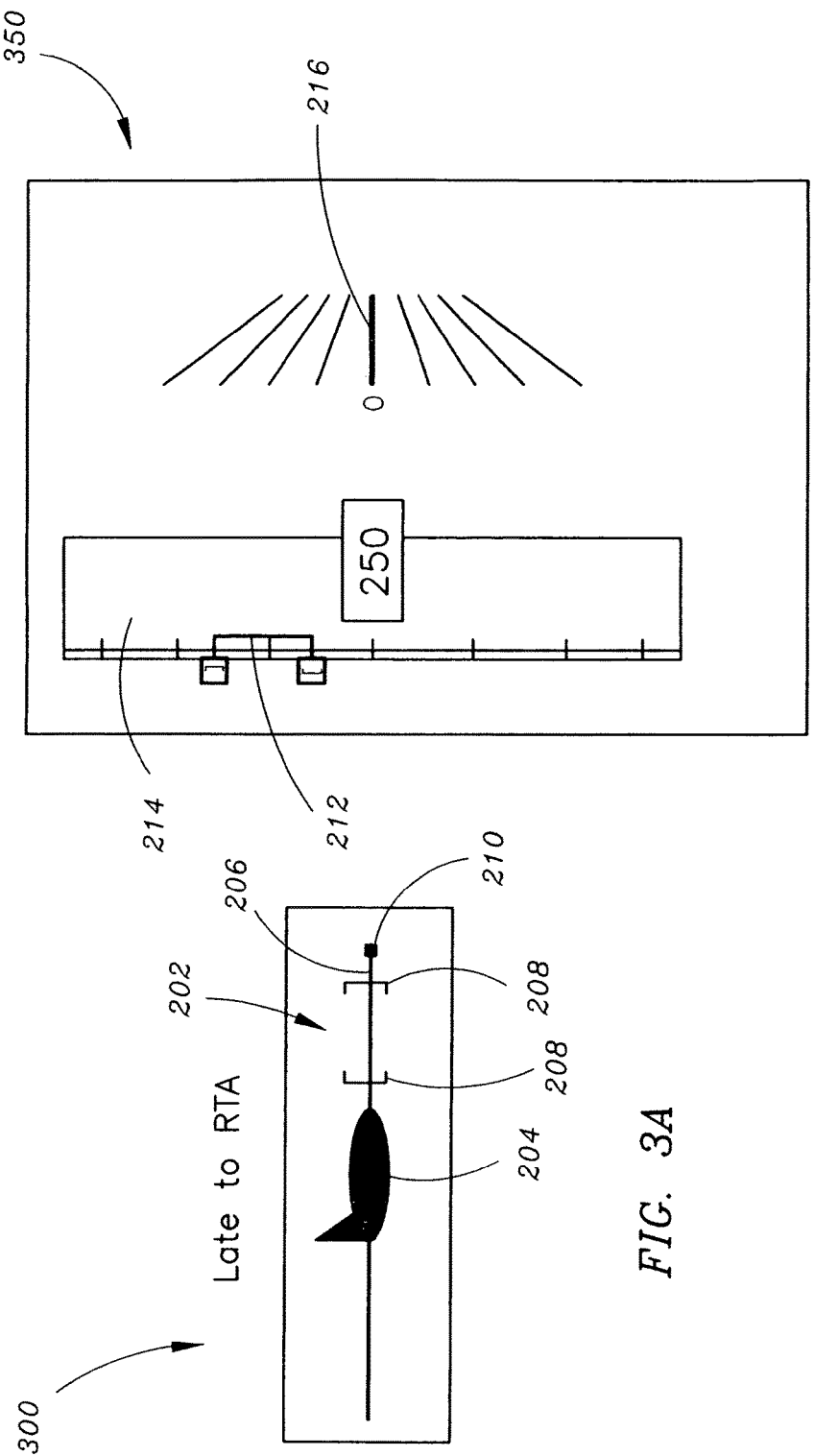

US 9,829,341 B1

SYSTEM AND METHOD FOR PROVIDING FLIGHT CUES FOR THE NAVIGATION FUNCTION REQUIRED TIME OF ARRIVAL (RTA)

FIELD OF THE INVENTION

The present invention relates to the field of flight deck situational awareness systems/flight deck human-machine interfaces (HMIs) and particularly to a system and method for providing flight cues for the navigation function Required Time of Arrival (RTA).

BACKGROUND OF THE INVENTION

Currently available flight deck situational awareness systems may not provide a desired level of awareness/a desired amount of information regarding certain types of aircraft navigation information.

Thus, it would be desirable to provide a system or method which addresses the shortcomings of currently available solutions.

SUMMARY OF THE INVENTION

Accordingly, an embodiment of the present invention is directed to a flight deck situational awareness system for displaying Required Time of Arrival (RTA) information for an aircraft, including: a memory configured for storing aircraft navigation information for the aircraft; a processor configured for being communicatively coupled with the memory and further configured for receiving the aircraft navigation information stored in the memory, the processor being further configured for generating a depiction based upon the aircraft navigation information, the depiction including one or more (ex.—a plethora) of coordinated Required Time of Arrival (RTA) flight cues for the aircraft; and a display configured for being communicatively coupled with the processor, the display being further configured for receiving the depiction from the processor and for displaying the depiction.

An additional embodiment of the present invention is directed to a method for providing Required Time of Arrival (RTA) information for an aircraft via a flight deck situational awareness system of the aircraft, including: receiving aircraft navigation information for the aircraft; based upon the received aircraft navigation information, determining a predicted time of arrival at an assigned RTA clearance location for the aircraft; based upon the predicted time of arrival at the assigned RTA clearance location, generating a time cue for indicating a predicted arrival status of the aircraft relative to an assigned RTA clearance time for the aircraft; based upon the received aircraft navigation information, generating a first depiction, the first depiction including the time cue; and displaying the first depiction.

A further embodiment of the present invention is directed to a computer-readable medium having computer-executable instructions for performing a method for providing Required Time of Arrival (RTA) information for an aircraft via a flight deck situational awareness system of the aircraft, said method including: receiving aircraft navigation information for the aircraft; based upon the received aircraft navigation information, determining at least one of: a predicted time of arrival at an assigned RTA clearance location for the aircraft; a prescribed speed value for the aircraft for promoting arrival of the aircraft at an assigned RTA clearance time for the aircraft and at the assigned RTA clearance location for the aircraft; and a prescribed range of speed values for the aircraft for promoting arrival of the aircraft at the assigned RTA clearance time for the aircraft and at the assigned RTA clearance location for the aircraft; based upon at least one of: the predicted time of arrival; the prescribed speed value; and the prescribed range of speed values, generating at least one of: a time cue for indicating a predicted arrival status of the aircraft relative to the assigned RTA clearance time for the aircraft; and a speed cue for indicating at least one of: the prescribed speed value for the aircraft for promoting arrival of the aircraft at the assigned RTA clearance time for the aircraft and at the assigned RTA clearance, location for the aircraft; and the prescribed range of speed values for promoting arrival of the aircraft at the assigned RTA clearance time for the aircraft and at the assigned RTA clearance location for the aircraft; based upon the received aircraft navigation information, generating a depiction, the depiction including at least one of: the time cue and the speed cue; and displaying the depiction.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 2A is a screen shot of a depiction which may be displayed via a display of the system of the present invention, said depiction being/including a level flight profile for an aircraft, the depiction including a time cue, said time cue indicating that the aircraft is projected to arrive at its RTA clearance location at its assigned RTA clearance time/within its assigned RTA clearance time window (ex.—the aircraft's predicted arrival status is "on-time");

FIG. 2B is a screen shot of a depiction which may be displayed via a display of the system of the present invention, said depiction being/including an airspeed indicator and a vertical speed indicator (VSI) for the aircraft shown in FIG. 2A, the depiction including a speed cue, said speed cue indicating on the airspeed indicator a prescribed range of speed values which, if traveled at by the aircraft, are projected to allow the aircraft to maintain its "on-time" predicted arrival status;

FIG. 3A is a screen shot of a depiction which may be displayed via a display of the system of the present invention, said depiction being/including a level flight profile for an aircraft, the depiction including a time cue, said time cue indicating that the aircraft is projected to arrive at its RTA clearance location later than its assigned RTA clearance time/outside of its assigned RTA clearance time window (ex.—the aircraft's predicted arrival status is "late");

FIG. 3B is a screen shot of a depiction which may be displayed via a display of the system of the present invention, said depiction being/including an airspeed indicator and a vertical speed indicator (VSI) for the aircraft shown in FIG. 3A, the depiction including a speed cue, said speed cue indicating on the airspeed indicator a prescribed range of speed values which, if traveled at by the aircraft, are projected to allow the aircraft to attain "on-time" predicted arrival status;

DETAILED DESCRIPTION OF THE INVENTION

Reference will now be made in detail to the presently preferred embodiments of the invention, examples of which are illustrated in the accompanying drawings.

As the volume of air traffic increases, airspace is becoming increasingly congested. Because of this increasingly congested airspace, it may be desirable for pilots/flight crew members to be able to navigate their aircrafts with a greater degree of precision, such as when executing Required Time of Arrival (RTA) clearances. If pilots/flight crew members are able to consistently navigate their aircrafts to their assigned RTA clearance locations at their assigned RTA clearance times (ex.—within their assigned RTA clearance time windows), this may allow air traffic controllers to assign more narrowly defined (ex.—in time and airspace) RTA clearance points (ex.—shorter/smaller RTA clearance time windows) to said aircrafts. Further, this may allow air traffic control to successfully manage/coordinate navigation of a larger number of aircrafts within a given portion of airspace, with reduced time separation between the aircrafts.

Current avionic systems may promote positional accuracy by providing/displaying airspeed indicators and vertical speed indicators for use by pilots/flight crew members. However, these current systems may not provide a desirable level of RTA information for the aircraft. Unlike current systems, the system (ex.—flight deck situational awareness system) of the present invention may provide/display RTA flight cue(s) to a pilot/flight crew member of an aircraft. For example, the system of the present invention may provide a predictive indicator (ex.—a time cue) to a pilot/flight crew member of an aircraft, said predictive indicator indicating whether that aircraft is predicted to reach an RTA clearance location in a timely manner. Further, the system of the present invention may provide/display one or more speed adjustment cues/coordinated speed adjustment cues (ex.— speed cues), which may indicate a prescribed speed value/prescribed range of speed values. By making adjustments to navigate the aircraft at the prescribed speed(s), a pilot may utilize the speed cues to reach the RTA clearance location in a timely manner. (ex.—at the assigned time/within the assigned time window).

Figure 1:
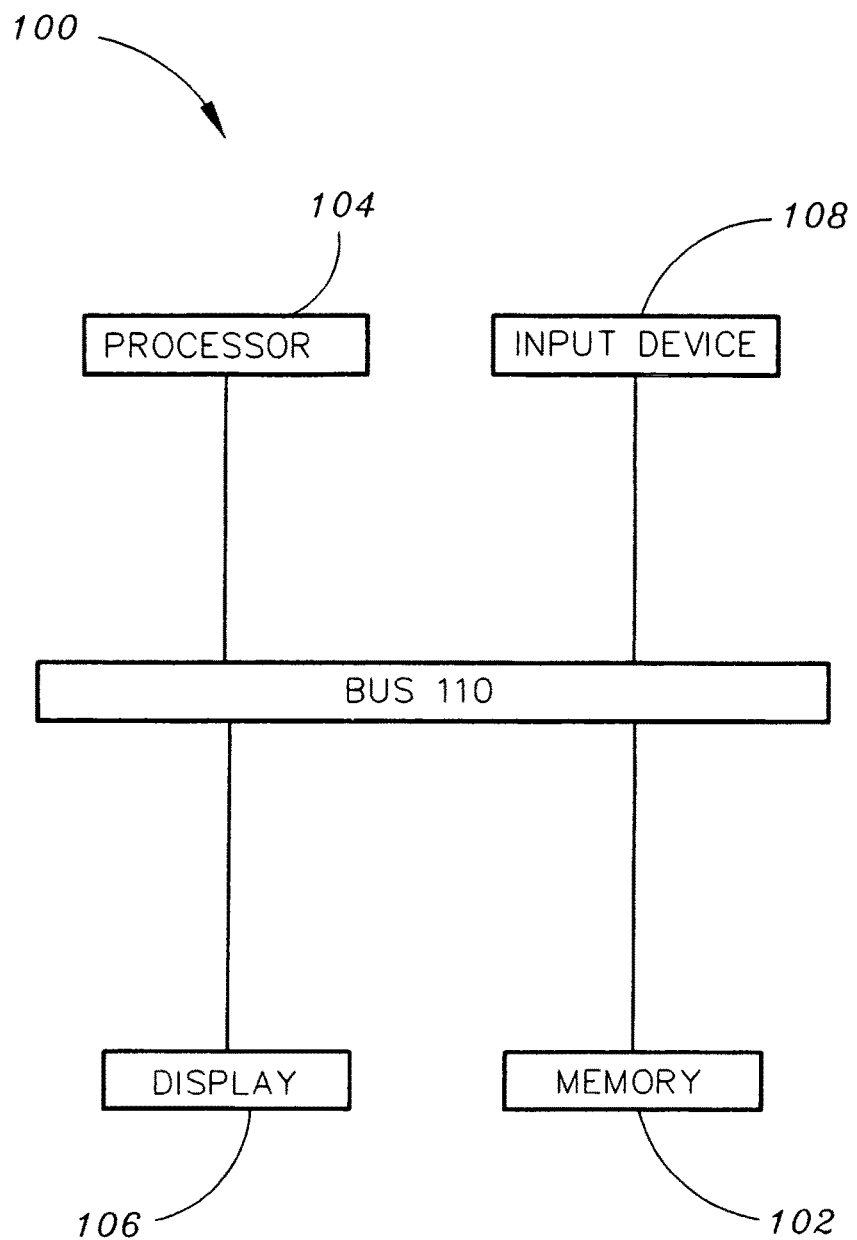
FIG. 1 is a block diagram schematic of a flight deck situational awareness system for displaying Required Time of Arrival (RTA) information for an aircraft in accordance with an exemplary embodiment of the present invention.

Referring generally to FIG. 1, a block diagram schematic of a system, such as a flight deck situational awareness system, for displaying Required Time of Arrival (RTA) information for an aircraft (ex.—such as the aircraft implementing the system 100) in accordance with an exemplary embodiment of the present invention is shown. In the illustrated embodiment, the system 100 includes a memory 102. The memory 102 may be configured for storing various aircraft navigation information for the aircraft, such as: Required Time of Arrival Clearance Information (ex.—an assigned RTA clearance location/destination for the aircraft, an assigned RTA clearance time/an assigned RTA clearance time window for the aircraft, note: an assigned RTA clearance time may be a time included within the assigned RTA clearance time window); positional information for the aircraft (ex.—a current location of the aircraft, a current altitude of the aircraft, a current heading/trajectory of the aircraft); performance information for the aircraft (ex.—a current airspeed of the aircraft, a current vertical speed of the aircraft, a current acceleration of the aircraft, current aircraft loading information, a current aircraft weight, and/or various performance characteristics of the aircraft); navigational environment information for the aircraft (ex.—a current wind speed in a vicinity of the aircraft, a current wind direction of wind in the vicinity of the aircraft); approach path information (ex.—prescribed glide path/glide slope information/data for various runways/approaches/approach paths, or the like); landing area information (ex.—runway location/runway dimension information/data, runway ID data/information); and terrain information (ex.—information/data regarding terrain/obstacle locations and characteristics).

In exemplary embodiments, the memory 102 of the system 100 may be configured for dynamically receiving and updating one for more of the above-mentioned types of data/information in real time (ex—via inputs to the memory 102, said inputs provided by one or more input devices 108, such as aircraft sensors, antennas, Global Positioning System (GPS) devices, Inertial Reference System devices, or the like which may be communicatively coupled to the memory).

In the illustrated embodiment, the system 100 further includes a processor 104. The processor 104 is configured for being communicatively coupled with the memory 102 and is further configured for receiving the above-referenced aircraft navigation information/data which may be stored in the memory 102. The processor 104 may be further configured for generating depiction(s)/images based upon the received aircraft navigation information/data. Further, the processor 104 may be configured for dynamically (ex.—in real time) receiving the updated aircraft navigation information from the memory 102 and for dynamically updating the depiction(s).

In further embodiments, the system 100 may include a display 106 (ex.—a glass cockpit display). The display 106 may be configured for being communicatively coupled with the processor 104. The display 106 may be further configured for receiving the depiction(s) (ex.—which are shown in FIGS. 2A through 10B) which is/are output to the display 106 from the processor 104. The display 106 may be further configured for displaying the depiction(s)/image(s)/screen shot(s). For instance, the depiction(s) may be/may include: a level flight profile for the aircraft (FIGS. 2A, 3A and 4A); a vertical flight profile for the aircraft, such as an ascent profile (FIGS. 5A, 6A and 7A) or a descent profile (FIGS. 8A, 9A and 10A); an airspeed indicator for the aircraft (ex.—a speed tape graphical indicator); and/or a vertical speed indicator (VSI) for the aircraft (FIGS. 2B, 3B, 4B, 5B, 6B, 7B, 8B, 9B and 10B). In additional embodiments, information/data stored in the memory 102 may include information provided by a pilot/flight crew member (ex.— RTA Clearance Information, such as an assigned RTA clearance location/destination for the aircraft, an assigned RTA clearance time/time window for the aircraft) via the input device(s) (ex.—via a keyboard, audio input device, etc.). In further embodiments, the display 106 may be communicatively coupled with the memory 102, such that pilot/flight crew member-provided information may be provided to the memory 102 via a display input mechanism of the display 106, such as via a touch screen of the display 106. Still further, one or more of the memory 102, the processor 104, the display 106, and the input devices 108 may be communicatively coupled via a bus 110. Further, the display 106 may be configured for dynamically receiving and displaying updated depiction(s) from the processor 104 based on updated aircraft navigation information received by the system 100.

In exemplary embodiments, depictions which may be provided to the display 106/displayed via the display 106 are shown in FIGS. 2A through 10B. Referring generally to FIG. 2A, a screen shot of a depiction 200 which may be provided to/displayed via the display 106 of the system 100 of the present invention is shown. In FIG. 2A, the depiction is/includes/depicts a level flight profile 202 for the aircraft (ex.—the aircraft is not beginning/performing an ascent or a descent). The level flight profile 202 may include a current position indicator 204 for the aircraft, said aircraft current position indicator 204 being positioned along a generally horizontal line/vector 206, which may indicate a current path of travel for the aircraft (ex.—lateral flight path indicator 206). The depiction 200/level flight profile 202 may further include an RTA flight cue, such as a time cue 208 (as in FIG. 2A). In the illustrated embodiments, the time cue 208 is represented as a pair of brackets positioned on/along the level flight profile 202/lateral flight path indicator 206. In exemplary embodiments, the time cue 208 (ex.—via its location relative to the aircraft current position indicator 204) may indicate a predicted arrival status of the aircraft relative to an RTA clearance time/an assigned RTA clearance time/an assigned RTA clearance time window for the aircraft. For example, when the aircraft current position indicator 204 is depicted as being positioned within the brackets of the time cue 208/as being at a generally same position along or on the lateral flight path indicator 206 (as in FIG. 2A), the time cue 208 (ex.—the brackets may represent the assigned RTA clearance time window) is indicating in/on the level flight profile 202 that the aircraft, based on its current aircraft navigation information, is projected to arrive at its assigned RTA clearance location at its assigned RTA clearance time/within its assigned RTA clearance time window (ex.—the aircraft's predicted arrival status is "on-time"). The RTA clearance location/position/destination/point may be represented on/along/at one end of the lateral flight path indicator 206 by an RTA clearance position marker 210 (ex.—square, dot, hash, etc.). The time cue 208 of the present invention is advantageous in that it provides a predictive indicator, such as to a flight crew member/pilot, of the aircraft's status relative to its assigned RTA clearance location (ex.—that the aircraft is "on time").

In current embodiments of the present invention, the depiction 200 may include/an alternate depiction may be provided which includes/an additional depiction 250 may be provided which includes a different type of RTA flight cue. In the embodiment illustrated in FIG. 2B, the depiction 250 may include one or more speed cues 212 (ex.—each speed cue 212 being represented by a pair of brackets). Further, the depiction 250 may include an airspeed indicator 214 and a vertical speed indicator 216. The speed cue(s) 212 may be positioned on/along the airspeed indicator 214 and/or the vertical speed indicator (VSI) 216 for indicating a prescribed speed value or a prescribe range of speed values (ex.—airspeed values or vertical speed values) for the aircraft, which, if traveled at by the aircraft, may allow the aircraft to maintain/attain "on-time" status relative to its assigned RTA clearance time. For example, in the depiction 250 shown in FIG. 2A, the speed cue 212 is located/positioned/depicted on the airspeed indicator 214 (ex.—a speed tape graphical indicator) and the brackets of the speed cue encompass corresponding speed values on the speed tape. These encompassed values represent the prescribed range of speed values (ex.—airspeed values), which the system 100 determines that, if traveled at, may allow the aircraft to maintain/attain "on-time" status relative to its assigned RTA clearance time. The depiction 250 shown in FIG. 2B illustrates a supplementary or corresponding depiction which may accompany the depiction 200 shown in FIG. 2A. For example, as discussed above, the time cue 208 of the depiction 200 shown in FIG. 2A is indicating that the aircraft is projected as being "on-time" or on schedule for arriving at its assigned RTA clearance location at its assigned RTA clearance time/within its assigned RTA clearance time window. The depiction 205 shown in FIG. 2B may supplement the depiction 200 shown in FIG. 2A because the speed cue 212 in the depiction 250 shown in FIG. 2B indicates the prescribed range of airspeed values for the aircraft for promoting arrival of the aircraft at the assigned RTA clearance location for the aircraft and at the assigned RTA clearance time for the aircraft (ex.—airspeed values which, if traveled at by the aircraft, may allow the aircraft to maintain (in this case) its "on-time" status relative to its assigned RTA clearance time). The depiction 250 shown in FIG. 2B does not provide a speed cue 212 on the vertical speed indicator 216 because said depiction 250 corresponds to the depiction 200 shown in FIG. 2A, which indicates that aircraft is navigating a level flight profile 202 and not a vertical flight profile. The speed cue 208 of the present invention is advantageous in that it provides supplementary prescriptive information/a distinct indication of what measures/adjustments (ex.—speed adjustments, if any) a pilot may need to make when navigating the aircraft which may allow that aircraft to maintain/attain its projected "on time" status relative to its assigned RTA clearance time/location, which may promote actual on-time arrival of the aircraft at the assigned RTA clearance location.

Further, as mentioned above, depiction 250 may be provided as a single depiction (as part of depiction 200) or as a separate depiction (distinct from depiction 200, as illustrated) and may be provided via the same display 106 as depiction 200, or via an additional alternate display.

In an alternative scenario/embodiment, as shown in FIG. 3A, the system 100 may generate an alternate depiction/updated depiction 300 in which the time cue 208 may be located/re-located/updated such that the aircraft current position indicator 204 is located outside of and to the left of the brackets of the time cue 208 along or on the lateral flight path indicator 206. In FIG. 3A, the time cue 208 is indicating in/on the level flight profile 202 that the aircraft, based on current aircraft navigation information/updated current navigation information, is projected to arrive at its assigned RTA clearance location later than its assigned RTA clearance time/outside of its assigned RTA clearance time window (ex.—the aircraft's predicted arrival status is "late"). This alerts a pilot/flight crew member that adjustments may need to be made in order to navigate the aircraft so that it reaches the assigned RTA clearance location on-time.

The depiction 350 illustrated in FIG. 3B corresponds to the scenario depicted in FIG. 3A and may provide a prescriptive indication of what adjustments/measures need to be taken. For example, it may be that the aircraft navigated at speeds less than those included in the prescribed speed range indicated in FIG. 2B, and that the depiction 300 in FIG. 3A was provided subsequent to the depiction 200 in FIG. 2A (ex.—the depiction 200 in FIG. 2A was updated to the depiction 300 in FIG. 3A/the depiction 300 in FIG. 3A is an updated version of the depiction 200 in FIG. 2A) to indicate that the aircraft is no longer "on-time" (or is now late). Correspondingly, the depiction 350 in FIG. 3B may have been provided subsequent to the depiction 250 in FIG. 2B (ex.—the depiction 250 in FIG. 2B was updated to the depiction 350 in FIG. 3B). Because the depiction 300 in FIG. 3A now depicts the aircraft as having a projected "late" status relative to its assigned RTA clearance time/location, the speed cue 212 in the corresponding/supplementary depiction 350 in FIG. 3B is now located/has been repositioned on the airspeed indicator 214 to indicate that the aircraft has to travel at a higher prescribed range of airspeeds/higher airspeeds (than indicated in FIG. 2B) in order to attain/re-attain projected "on-time" status.

Figures 4A, 4B:
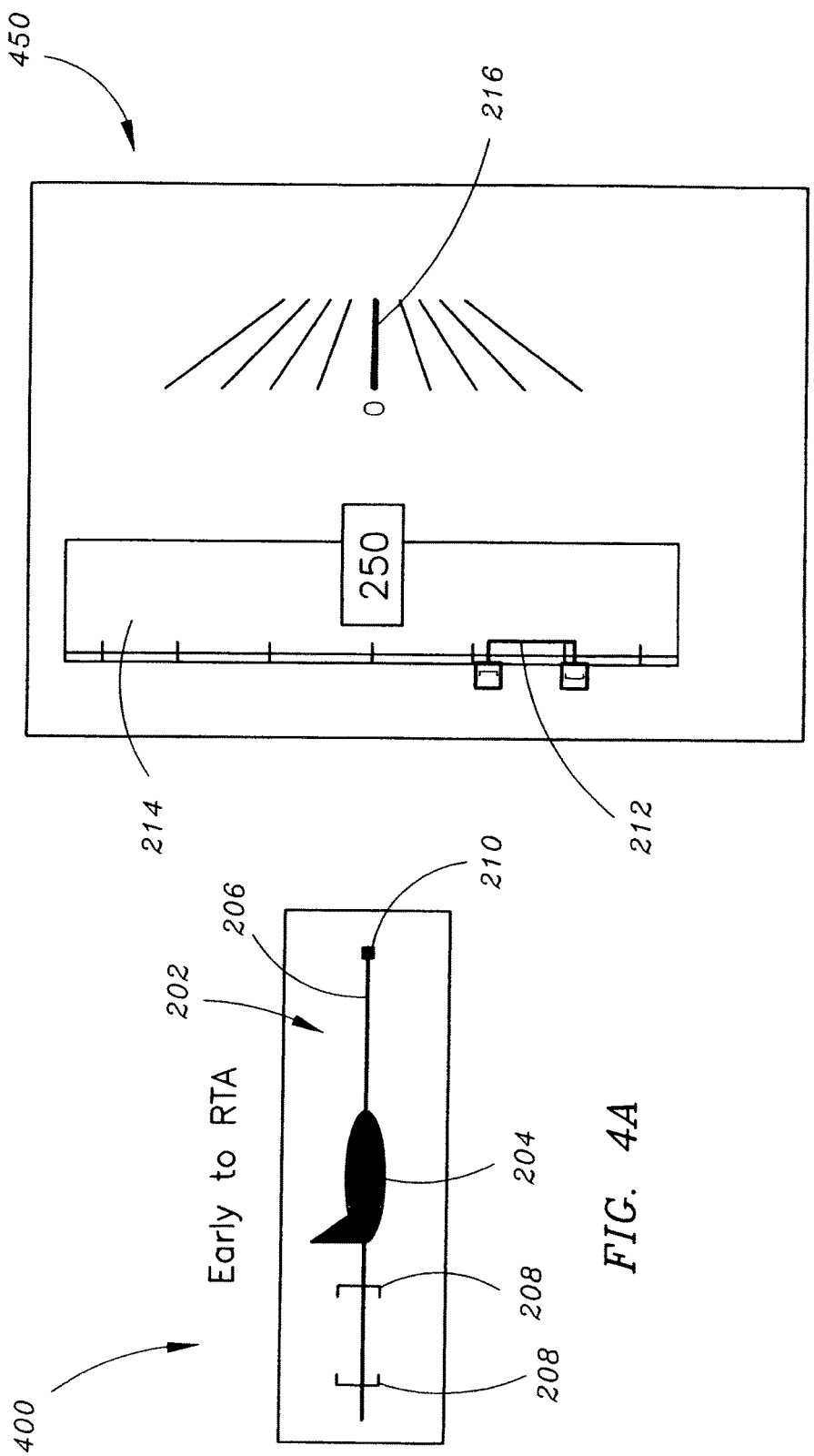
FIG. 4A is a screen shot of a depiction which may be displayed via a display of the system of the present invention, said depiction being/including a level flight profile for an aircraft, the depiction including a time cue, said time cue indicating that the aircraft is projected to arrive at its RTA clearance location earlier than its assigned RTA clearance time/outside of its assigned RTA clearance time window (ex.—the aircraft's predicted arrival status is "early")
FIG. 4B is a screen shot of a depiction which may be displayed via a display of the system of the present invention, said depiction being/including an airspeed indicator and a vertical speed indicator (VSI) for the aircraft shown in FIG. 4A, the depiction including a speed cue, said speed cue indicating on the airspeed indicator a prescribed range of speed values which, if traveled at by the aircraft, are projected to allow the aircraft to attain "on-time" predicted arrival status.

In a further alternative scenario/embodiment, as shown in FIG. 4A, the system 100 may generate an alternate depiction/updated depiction 400 in which the time cue 208 may be located/re-located/updated such that the aircraft current position indicator 204 is located outside of and to the right of the brackets of the time cue 208 along or on the lateral flight path indicator 206. In FIG. 4A, the time cue 208 is indicating in/on the level flight profile 202 that the aircraft, based on current aircraft navigation information/updated current navigation information, is projected to arrive at its assigned RTA clearance location earlier than its assigned RTA clearance time/outside of its assigned RTA clearance time window (ex.—the aircraft's predicted arrival status is "late"). This alerts a pilot/flight crew member that adjustments may need to be made in order to navigate the aircraft so that it reaches the assigned RTA clearance location on-time, rather than too early.

The depiction 450 illustrated in FIG. 4B corresponds to the scenario depicted in FIG. 4A and may provide a prescriptive indication of what adjustments/measures need to be taken. For example, it may be that the aircraft navigated at speeds greater than those included in the prescribed speed range indicated in FIG. 3B, and that the depiction 400 in FIG. 4A was provided subsequent to the depiction 300 in FIG. 3A (ex.—the depiction 300 in FIG. 3A was updated to the depiction 400 in FIG. 4A/the depiction 400 in FIG. 4A is an updated version of the depiction 300 in FIG. 3A) to indicate that the aircraft is no longer "on-time" (or is now early/running ahead of schedule). Correspondingly, the depiction 450 in FIG. 4B may have been provided subsequent to the depiction 350 in FIG. 3B (ex.—the depiction 350 in FIG. 3B was updated to the depiction 450 in FIG. 4B). Because the depiction 400 in FIG. 4A now depicts the aircraft as having a projected "early" status relative to its assigned RTA clearance time/location, the speed cue 212 in the corresponding/supplementary depiction 450 in FIG. 4B is now located/has been repositioned on the airspeed indicator 214 to indicate that the aircraft has to travel at a lower prescribed range of airspeeds/lower airspeeds (than indicated in FIG. 3B) in order to attain/re-attain projected "on-time" status.

Figures 5A, 5B:
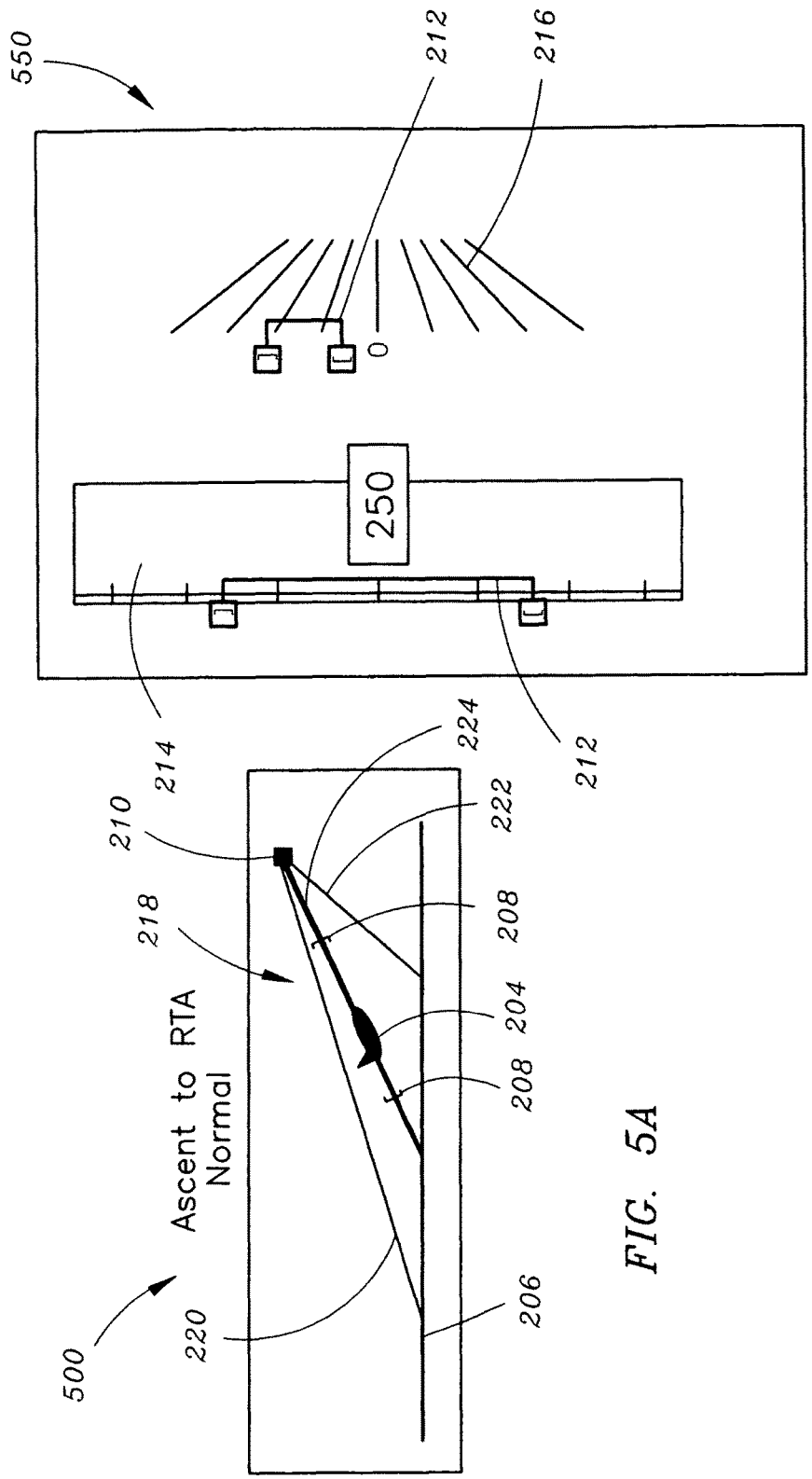
FIG. 5A is a screen shot of a depiction which may be displayed via a display of the system of the present invention, said depiction being/including a ascent profile for an aircraft, the depiction including a time cue, said time cue indicating that the aircraft is projected to arrive at its RTA clearance location at its assigned RTA clearance time/within its assigned RTA clearance time window (ex.—the aircraft's predicted arrival status is "on-time")
FIG. 5B is a screen shot of a depiction which may be displayed via a display of the system of the present invention, said depiction being/including an airspeed indicator and a vertical speed indicator (VSI) for the aircraft shown in FIG. 5A, the depiction including a first speed cue and a second speed cue, said first speed cue indicating on the airspeed indicator a prescribed range of speed values which, if traveled at by the aircraft, are projected to allow the aircraft to maintain its "on-time" predicted arrival status, the second speed cue indicating on the vertical speed indicator a prescribed range of vertical speed values which, if traveled at by the aircraft, are projected to allow the aircraft to maintain its "on-time" predicted arrival status.

In further embodiments, the system 100 may be configured for providing/generating/displaying depictions of/including vertical flight profiles for the aircraft. For example, FIGS. 5A, 6A and 7A are depictions of/are depictions which include an ascent flight profile 218 for the aircraft. In the depictions (500, 600, 700) shown in FIGS. 5A, 6A and 7A, the ascent flight profiles 218 may include a maximum vertical ascent speed vector 220, a minimum vertical ascent speed vector 222, an ascent flight path indicator 224 (for indicating the aircraft's current ascent flight path), the aircraft current position indicator 204 (for indicating the aircraft's current position, such as the aircraft's current position along/on the ascent flight path), the RTA clearance position marker 210 and the lateral flight path indicator 206.

In exemplary embodiments, each of the depictions (500, 600, 700) may include the time cue 208. Referring to FIG. 5A, the time cue 208 is depicted as being located within/positioned on the ascent flight profile 218 such that the aircraft current position indicator 204 is depicted as being positioned within the brackets of the time cue 208, thereby indicating on the ascent flight profile 218 that the aircraft is projected to arrive at its assigned RTA clearance location (ex.—its assigned ascent RTA clearance location) on-time. Referring to FIG. 6A, the time cue 208 is depicted as being located within/positioned on the ascent flight profile 218 such that the aircraft current position indicator 204 is depicted as being positioned outside of/beyond the brackets of the time cue 208 and to the right of or past the brackets/time cue 208, thereby indicating on the ascent flight profile 218 that the aircraft is projected to arrive at its assigned RTA clearance location early. Referring to FIG. 7A, the time cue 208 is depicted as being located within/positioned on the ascent flight profile 218 such that the aircraft current position indicator 204 is depicted as being positioned outside of/beyond the brackets of the time cue 208 and to the left of or before the brackets/time cue 208, thereby indicating on the ascent flight profile 218 that the aircraft is projected to arrive at its assigned RTA clearance location late.

Figure 6B:
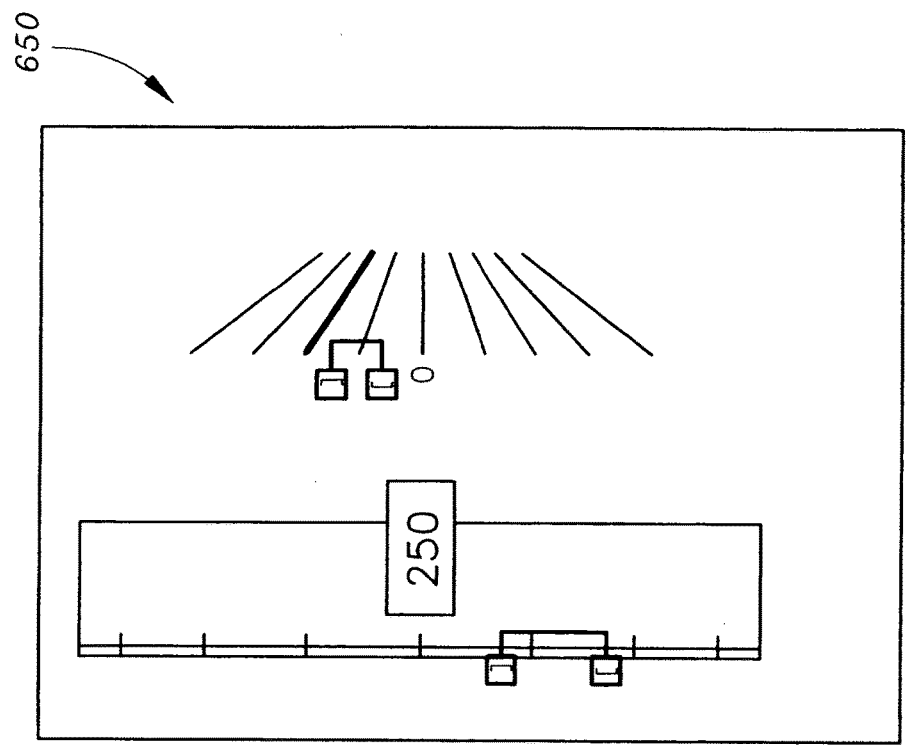
FIG. 6B is a screen shot of a depiction which may be displayed via a display of the system of the present invention, said depiction being/including an airspeed indicator and a vertical speed indicator (VSI) for the aircraft shown in FIG. 6A, the depiction including a first speed cue and a second speed cue, said first speed cue indicating on the airspeed indicator a prescribed range of speed values which, if traveled at by the aircraft, are projected to allow the aircraft to attain "on-time" predicted arrival status, the second speed cue indicating on the vertical speed indicator a prescribed range of vertical speed values which, if traveled at by the aircraft, are projected to allow the aircraft to attain "on-time" predicted arrival status.
Figure 6A:
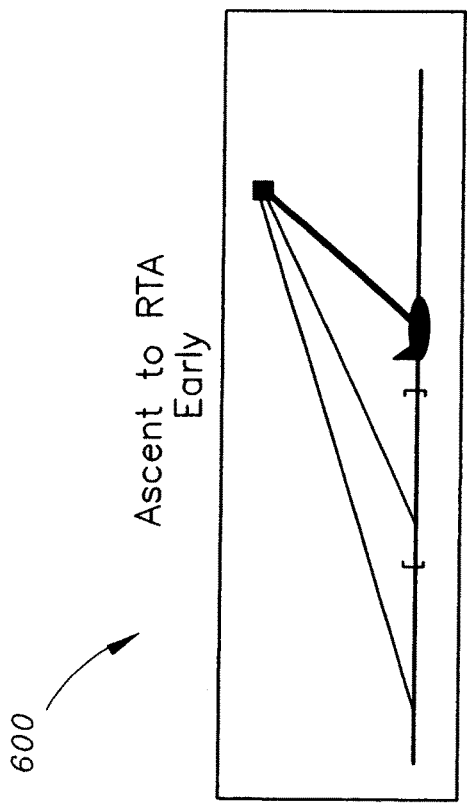
FIG. 6A is a screen shot of a depiction which may be displayed via a display of the system of the present invention, said depiction being/including an ascent profile for an aircraft, the depiction including a time cue, said time cue indicating that the aircraft is projected to arrive at its RTA clearance location earlier than its assigned RTA clearance time/outside of its assigned RTA clearance time window (ex.—the aircraft's predicted arrival status is "early")
Figure 7B:
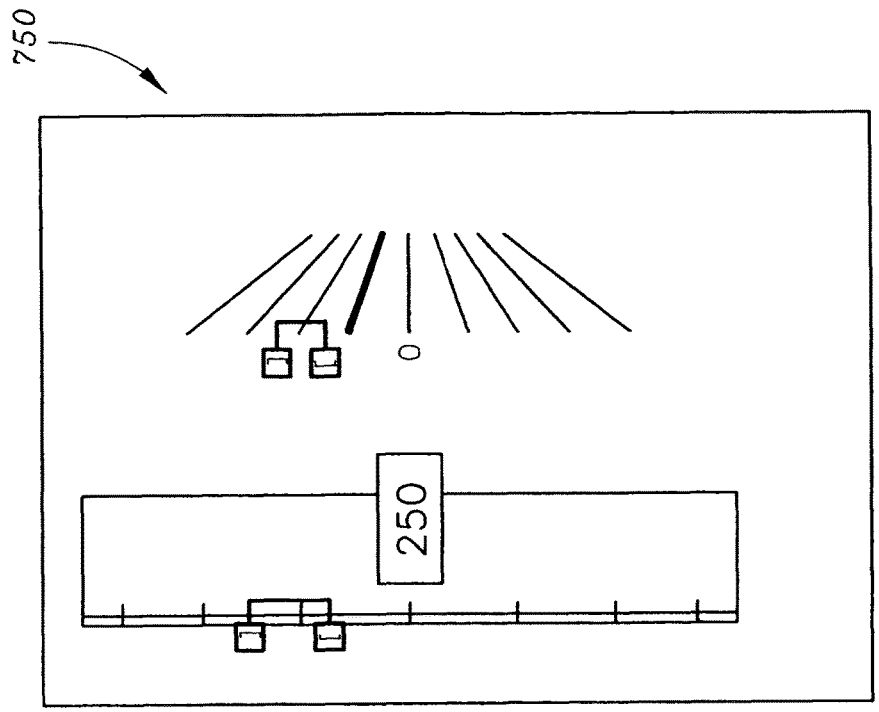
FIG. 7B is a screen shot of a depiction which may be displayed via a display of the system of the present invention, said depiction being/including an airspeed indicator and a vertical speed indicator (VSI) for the aircraft shown in FIG. 7A, the depiction including a first speed cue and a second speed cue, said first speed cue indicating on the airspeed indicator a prescribed range of speed values which, if traveled at by the aircraft, are projected to allow the aircraft to attain "on-time" predicted arrival status, the second speed cue indicating on the vertical speed indicator a prescribed range of vertical speed values which, if traveled at by the aircraft, are projected to allow the aircraft to attain "on-time" predicted arrival status.
Figure 7A:
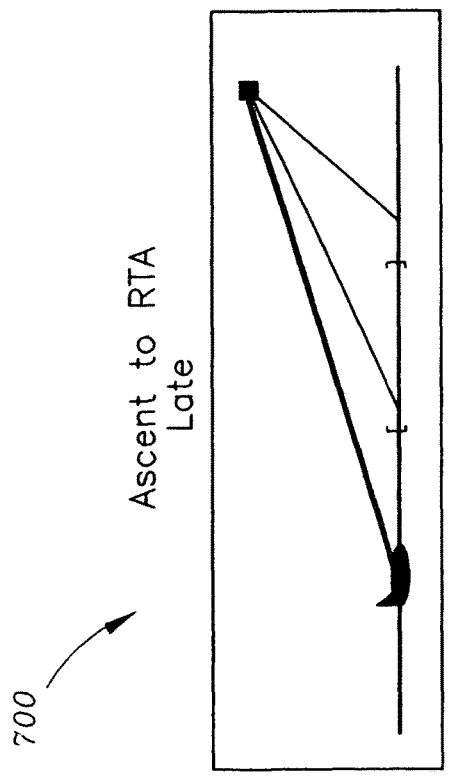
FIG. 7A is a screen shot of a depiction which may be displayed via a display of the system of the present invention, said depiction being/including a ascent profile for an aircraft, the depiction including a time cue, said time cue indicating that the aircraft is projected to arrive at its RTA clearance location later than its assigned RTA clearance time/outside of its assigned RTA clearance time window (ex.—the aircraft's predicted arrival status is "late")

In further embodiments, the system 100 may be configured for providing/generating/displaying further depictions (550, 650, 750), as shown in FIGS. 5B, 6B and 7B, which may correspond to/may supplement the ascent flight profile depictions (500, 600, 700) discussed above. Referring to FIGS. 5B, 6B and 7B, the depictions (550, 650, 750) shown may each include: one or more speed cues 212; the airspeed indicator 214; and the vertical speed indicator 216. In FIG. 5B, the depiction 550 includes a first speed cue 212 located/positioned on the airspeed indicator 214 (for indicating a prescribed airspeed value/range of airspeed values for the aircraft) and a second speed cue 212 located/positioned on the vertical speed indicator 216 (for indicating a prescribed vertical speed value/range of vertical speed values for the aircraft). For example, as discussed above, in the depiction 500 shown in FIG. 5A, the time cue 208 indicates on/for the ascent flight profile 218 that the aircraft is projected as being "on-time" with respect to its assigned RTA clearance time for its assigned RTA location. Further, the depiction 550 shown in FIG. 5B may correspond to/supplement the depiction 500 shown in FIG. 5A by allowing a pilot to take measures to navigate the aircraft to maintain its "on-time" status. For example, the speed cues 212 in the depiction 550 may indicate speeds (airspeeds and vertical speeds) which, if traveled at by the aircraft (when/while the aircraft is located as depicted in FIG. 5A), may allow that aircraft to maintain its projected "on time" status relative to its assigned RTA clearance time/location, which may promote actual on-time arrival of the aircraft at the assigned RTA clearance location.

Further, the depiction 650 shown in FIG. 6B may correspond to/supplement the depiction 600 shown in FIG. 6A by allowing a pilot to take measures/make adjustments to navigate (ex.—slow down) the aircraft so that it may go from having an "early" status to attaining "on-time" status. For example, the speed cues 212 in the depiction 650 may indicate speeds (airspeeds and vertical speeds, one or more of which may be slower speeds than those depicted in FIG. 5B) which, if traveled at by the aircraft (when/while the aircraft is located as depicted in FIG. 6A), may allow that aircraft to attain a projected "on time" status relative to its assigned RTA clearance time/location, which may promote actual on-time arrival of the aircraft at the assigned RTA clearance location.

Further, the depiction 750 shown in FIG. 7B may correspond to/supplement the depiction 700 shown in FIG. 7A by allowing a pilot to take measures/make adjustments to navigate (ex.—increase the speed of) the aircraft so that it may go from having a "late" status to attaining "on-time" status. For example, the speed cues 212 in the depiction 750 may indicate speeds (airspeeds and vertical speeds, one or more of which may be higher speeds than those depicted in FIG. 5B) which, if traveled at by the aircraft (when/while the aircraft is located as depicted in FIG. 7A), may allow that aircraft to attain a projected "on time" status relative to its assigned RTA clearance time/location, which may promote actual on-time arrival of the aircraft at the assigned RTA clearance location.

Figure 8A:
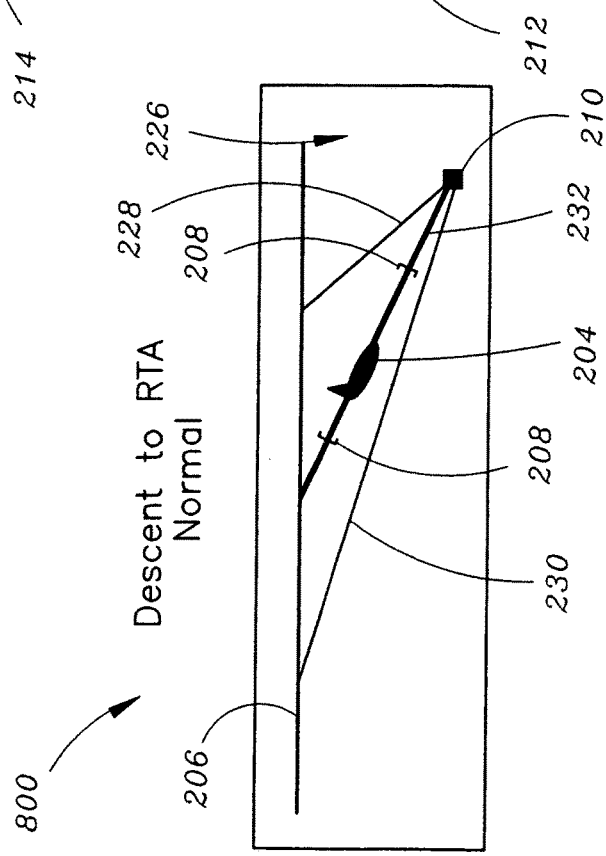
FIG. 8A is a screen shot of a depiction which may be displayed via a display of the system of the present invention, said depiction being/including a descent profile for an aircraft, the depiction including a time cue, said time cue indicating that the aircraft is projected to arrive at its RTA clearance location at its assigned RTA clearance time/within its assigned RTA clearance time window (ex.—the aircraft's predicted arrival status is "on-time")

In exemplary embodiments, the system 100 may be configured for providing/generating/displaying depictions of/including vertical flight profiles which are descent flight profiles 226 for the aircraft. For example, FIGS. 8A, 9A and 10A are depictions of/are depictions which include a descent flight profile 226 for the aircraft. In the depictions (800, 900, 1000) shown in FIGS. 8A, 9A and 10A, the descent flight profiles 226 may include a maximum vertical descent speed vector 228, a minimum vertical descent speed vector 230, a descent flight path indicator 232 (for indicating the aircraft's current descent flight path), the aircraft current position indicator 204 (for indicating the aircraft's current position, such as the aircraft's current position along/on the descent flight path), the RTA clearance position marker 210 and the lateral flight path indicator 206.

In exemplary embodiments, each of the depictions (800, 900, 1000) may include the time cue 208. Referring to FIG. 8A, the time cue 208 is depicted as being located within/positioned on the descent flight profile 226 such that the aircraft current position indicator 204 is depicted as being positioned within the brackets of the time cue 208, thereby indicating on the descent flight profile 226 that the aircraft is projected to arrive at its assigned RTA clearance location (ex.—its assigned descent RTA clearance location) on-time. Referring to FIG. 9A, the time cue 208 is depicted as being located within/positioned on the descent flight profile 226 such that the aircraft current position indicator 204 is depicted as being positioned outside of/beyond the brackets of the time cue 208 and to the right of or past the brackets/time cue 208, thereby indicating on the descent flight profile 226 that the aircraft is projected to arrive at its assigned RTA clearance location early. Referring to FIG. 10A, the time cue 208 is depicted as being located within/positioned on the descent flight profile 226 such that the aircraft current position indicator 204 is depicted as being positioned outside of/beyond the brackets of the time cue 208 and to the left of or before the brackets/time cue 208, thereby indicating on the descent flight profile 226 that the aircraft is projected to arrive at its assigned RTA clearance location late.

Figure 8B:
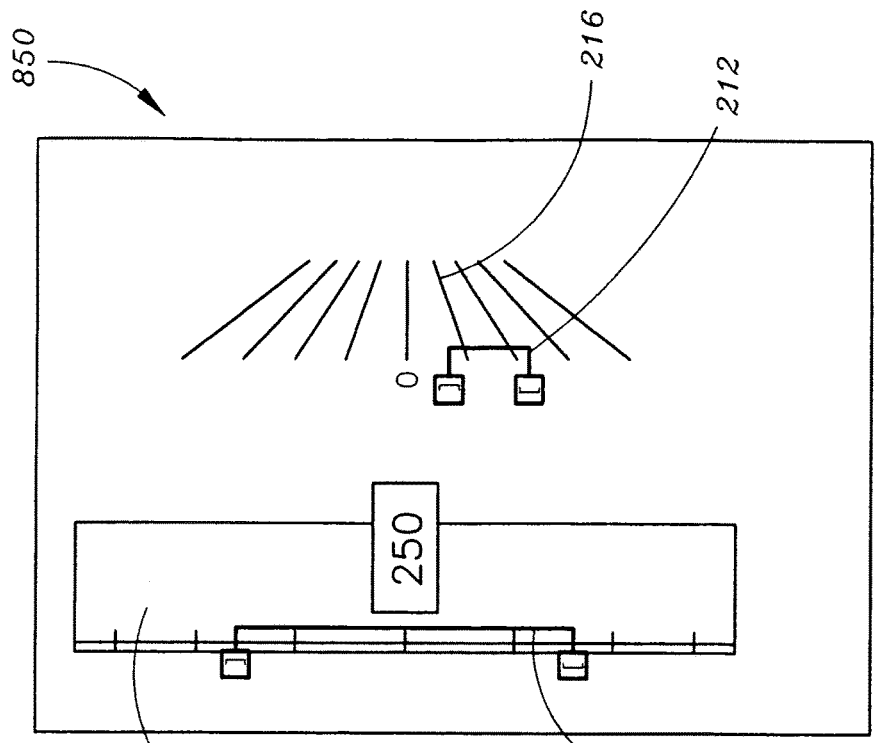
FIG. 8B is a screen shot of a depiction which may be displayed via a display of the system of the present invention, said depiction being/including an airspeed indicator and a vertical speed indicator (VSI) for the aircraft shown in FIG. 8A, the depiction including a first speed cue and a second speed cue, said first speed cue indicating on the airspeed indicator a prescribed range of speed values which, if traveled at by the aircraft, are projected to allow the aircraft to maintain its "on-time" predicted arrival status, the second speed cue indicating on the vertical speed indicator a prescribed range of vertical speed values which, if traveled at by the aircraft, are projected to allow the aircraft to maintain its "on-time" predicted arrival status.
Figure 9B:
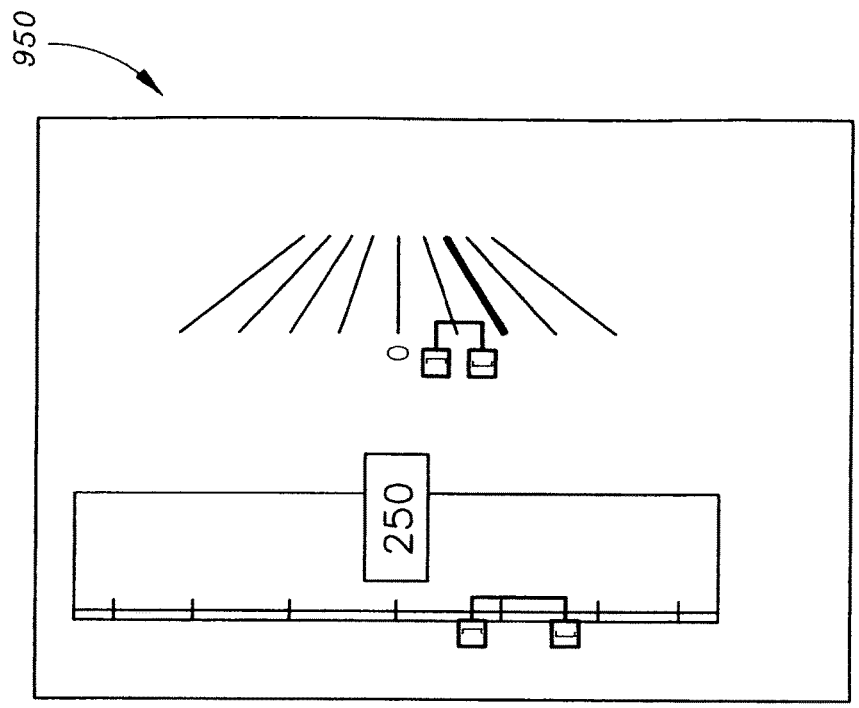
FIG. 9B is a screen shot of a depiction which may be displayed via a display of the system of the present invention, said depiction being/including an airspeed indicator and a vertical speed indicator (VSI) for the aircraft shown in FIG. 9A, the depiction including a first speed cue and a second speed cue, said first speed cue indicating on the airspeed indicator a prescribed range of speed values which, if traveled at by the aircraft, are projected to allow the aircraft to attain "on-time" predicted arrival status, the second speed cue indicating on the vertical speed indicator a prescribed range of vertical speed values which, if traveled at by the aircraft, are projected to allow the aircraft to attain "on-time" predicted arrival status.
Figure 9A:
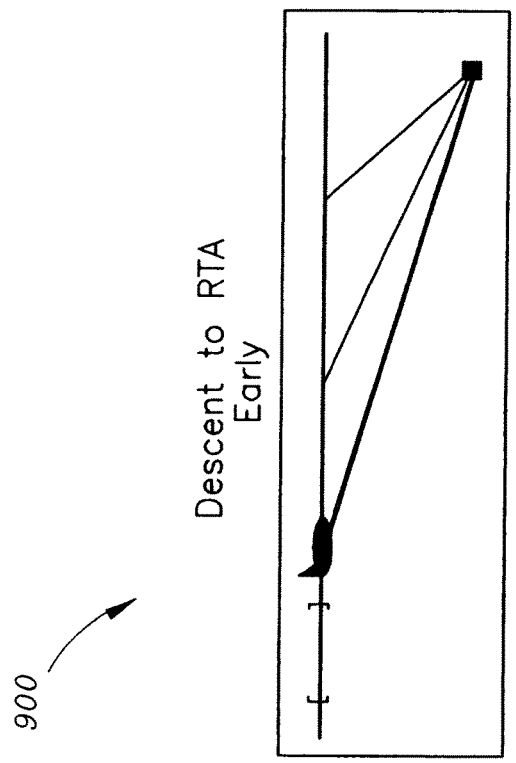
FIG. 9A is a screen shot of a depiction which may be displayed via a display of the system of the present invention, said depiction being/including an descent profile for an aircraft, the depiction including a time cue, said time cue indicating that the aircraft is projected to arrive at its RTA clearance location earlier than its assigned RTA clearance time/outside of its assigned RTA clearance time window (ex.—the aircraft's predicted arrival status is "early")
Figure 10B:
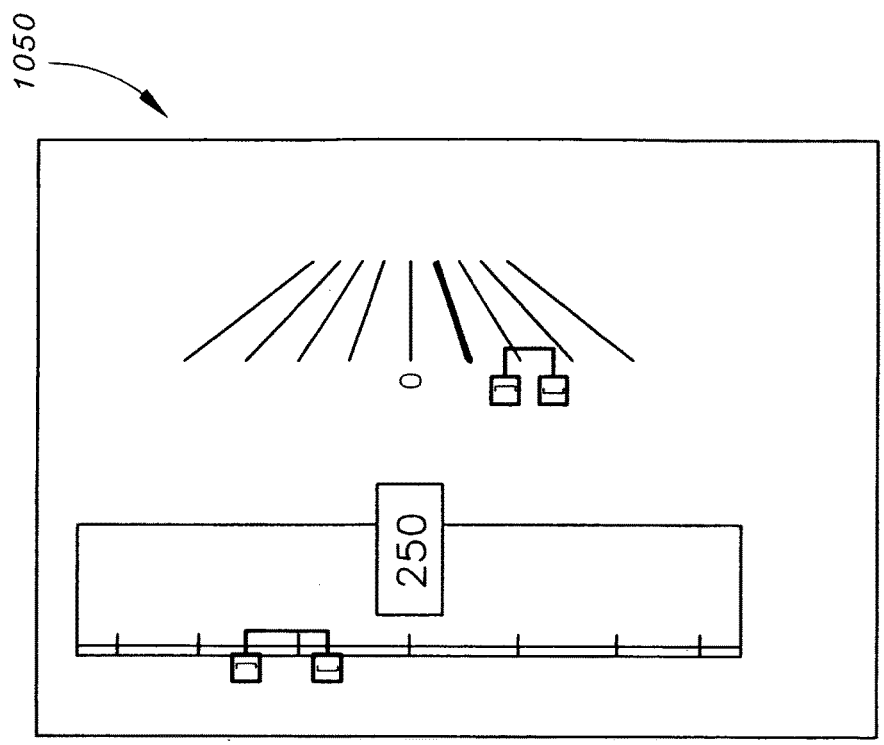
FIG. 10B is a screen shot of a depiction which may be displayed via a display of the system of the present invention, said depiction being/including an airspeed indicator and a vertical speed indicator (VSI) for the aircraft shown in FIG. 10A, the depiction including a first speed cue and a second speed cue, said first speed cue indicating on the airspeed indicator a prescribed range of speed values which, if traveled at by the aircraft, are projected to allow the aircraft to attain "on-time" predicted arrival status, the second speed cue indicating on the vertical speed indicator a prescribed range of vertical speed values which, if traveled at by the aircraft, are projected to allow the aircraft to attain "on-time" predicted arrival status.
Figure 10A:
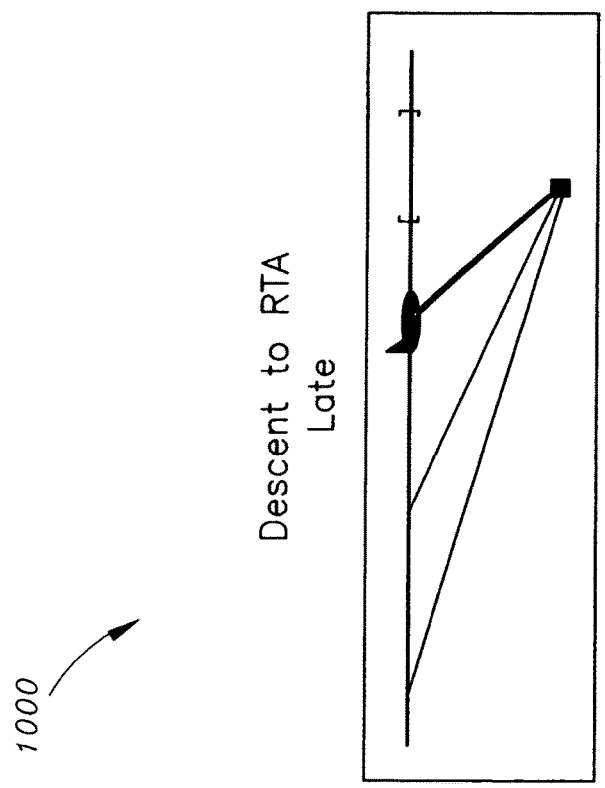
FIG. 10A is a screen shot of a depiction which may be displayed via a display of the system of the present invention, said depiction being/including a descent profile for an aircraft, the depiction including a time cue, said time cue indicating that the aircraft is projected to arrive at its RTA clearance location later than its assigned RTA clearance time/outside of its assigned RTA clearance time window (ex.—the aircraft's predicted arrival status is "late")

In further embodiments, the system 100 may be configured for providing/generating/displaying further depictions (850, 950, 1050), as shown in FIGS. 8B, 9B and 10B, which may correspond to/may supplement the descent flight profile depictions (800, 900, 1000) discussed above. Referring to FIGS. 8B, 9B and 10B, the depictions (850, 950, 1050) shown may each include: one or more speed cues 212; the airspeed indicator 214; and the vertical speed indicator 216. In FIG. 8B, the depiction 850 includes a first speed cue 212 located/positioned on the airspeed indicator 214 (for indicating a prescribed airspeed value/range of airspeed values for the aircraft) and a second speed cue 212 located/positioned on the vertical speed indicator 216 (for indicating a prescribed vertical speed value/range of vertical speed values for the aircraft). For example, as discussed above, in the depiction 800 shown in FIG. 8A, the time cue 208 indicates on/for the descent flight profile 218 that the aircraft is projected as being "on-time" with respect to its assigned RTA clearance time for its assigned RTA location. Further, the depiction 850 shown in FIG. 8B may correspond to/supplement the depiction 800 shown in FIG. 8A by allowing a pilot to take measures to navigate the aircraft to maintain its "on-time" status. For example, the speed cues 212 in the depiction 850 may indicate speeds (airspeeds and vertical speeds) which, if traveled at by the aircraft (when/while the aircraft is located as depicted in FIG. 8A), may allow that aircraft to maintain its projected "on time" status relative to its assigned RTA clearance time/location, which may promote actual on-time arrival of the aircraft at the assigned RTA clearance location.

Further, the depiction 950 shown in FIG. 9B may correspond to/supplement the depiction 900 shown in FIG. 9A by allowing a pilot to take measures/make adjustments to navigate (ex.—slow down) the aircraft so that it may go from having an "early" status to attaining "on-time" status. For example, the speed cues 212 in the depiction 950 may indicate speeds (airspeeds and vertical speeds, one or more of which may be slower speeds than those depicted in FIG. 8B) which, if traveled at by the aircraft (when/while the aircraft is located as depicted in FIG. 9A), may allow that aircraft to attain a projected "on time" status relative to its assigned RTA clearance time/location, which may promote actual on-time arrival of the aircraft at the assigned RTA clearance location.

Further, the depiction 1050 shown in FIG. 10B may correspond to/supplement the depiction 1000 shown in FIG. 10A by allowing a pilot to take measures/make adjustments to navigate (ex.—increase the speed of) the aircraft so that it may go from having a "late" status to attaining "on-time" status. For example, the speed cues 212 in the depiction 1050 may indicate speeds (airspeeds and vertical speeds, one or more of which may be higher speeds than those depicted in FIG. 8B) which, if traveled at by the aircraft (when/while the aircraft is located as depicted in FIG. 10A), may allow that aircraft to attain a projected "on time" status relative to its assigned RTA clearance time/location, which may promote actual on-time arrival of the aircraft at the assigned RTA clearance location.

In alternative embodiments, any one or more of the above-referenced indicators, cues, markers, vectors, or profiles of the present invention may be represented or depicted as/may be represented or depicted to include lines (solid, dashed, broken), arrows, bars, text, or other various graphical depictions/designs and may be accompanied by captioning/text, or the like.

In additional embodiments, any of the above-referenced depictions which include speed cues 212 may be displayed as a separate image/depiction from those depictions which include time cues 208. In further embodiments, the system 100 may include multiple displays 106 and depictions which include speed cues 212 may be displayed via a different display than depictions which include time cues 208. In further alternative embodiments, each of the above-referenced pairs of corresponding depictions, such as depictions 500 (ex.—time cue depiction) and 550 (ex.—speed cue depiction), may be displayed as a single (ex.—combined) depiction or as separate depictions. Still further, the airspeed indicator and its corresponding speed cue may be provided in a separate depiction (ex.—an airspeed indicator depiction) from the vertical speed indicator and its corresponding speed cue (ex.—the vertical speed indicator depiction) and, alternatively, the airspeed indicator depiction may be provided via a separate display 106 from the vertical speed indicator depiction.

Further, the time cue 208 and speed cues 212 may be updated/relocated/expanded/narrowed to represent/encompass varying time windows/ranges of speeds in different depictions.

Algorithms may be implemented to drive the above-referenced symbology/to carry out/provide at least a portion of the above-reference functionality of the present invention. Said algorithms may require input from a flight management function. Alternatively, algorithm execution may be part of the flight management function or may be performed/implemented within/by the system 100 of the present invention. The above-referenced symbology/functionality may be adapted to retrofit aircraft equipped with glass primary flight displays and flight management with aircraft performance algorithms and/or may promote ease of incorporation into forward fit offerings.

In further embodiments, order of precedence for displaying speed cues 212 may be superseded by depictions which include Traffic Alert and Collision Avoidance System (TCAS) are also displayed via the same display, with said speed cues 212 being displayed on a non-interfering basis.

Figure 11:
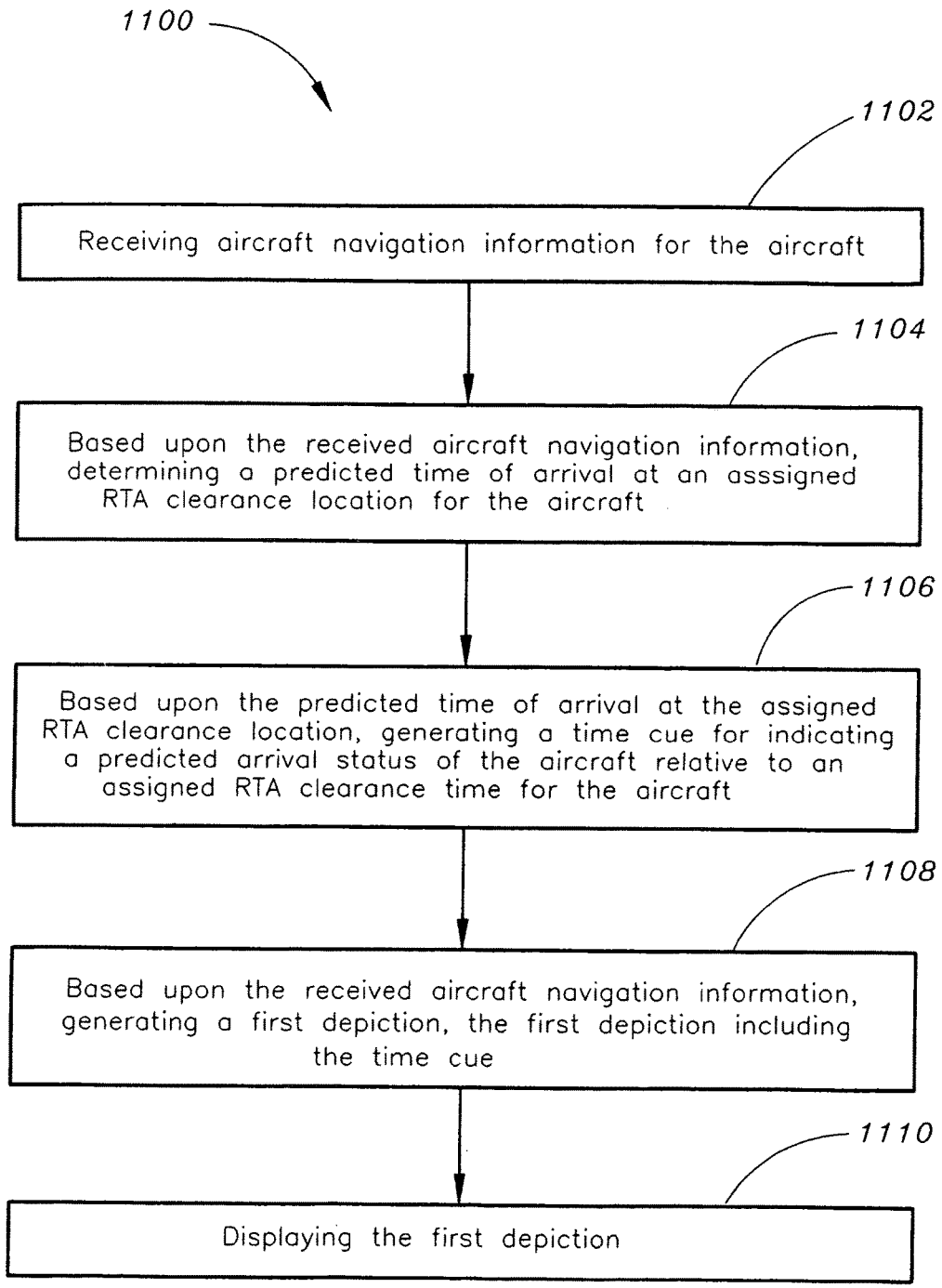
FIG. 11 is a flowchart illustrating a method for displaying/providing for providing Required Time of Arrival (RTA) information for an aircraft via a flight deck situational awareness system of the aircraft.

FIG. 11 is a flowchart illustrating a method for providing Required Time of Arrival (RTA) information for an aircraft via a flight deck situational awareness system of the aircraft in accordance with an exemplary embodiment of the present invention. The method 1100 may include receiving aircraft navigation information for the aircraft 1102. The method 1100 may further include, based upon the received aircraft navigation information, determining a predicted time of arrival at an assigned RTA clearance location for the aircraft 1104. The method 1100 may further include, based upon the predicted time of arrival at the assigned RTA clearance location, generating a time cue for indicating a predicted arrival status of the aircraft relative to an assigned RTA clearance time for the aircraft 1106. The method 1100 may further include, based upon the received aircraft navigation information, generating a first depiction, the first depiction including the time cue 1108. The method 1100 may further include displaying the first depiction 1110.

In exemplary embodiments, the method 1100 may further include, based upon the received aircraft navigation information, determining a prescribed speed value/prescribed range of speed values for the aircraft for promoting arrival of the aircraft at the assigned RTA clearance time for the aircraft and at the assigned RTA clearance location for the aircraft 1112. The method 1100 may further include generating a speed cue for indicating the prescribed speed value/prescribed range of speed values for the aircraft for promoting arrival of the aircraft at the assigned RTA clearance time for the aircraft and at the assigned RTA clearance location for the aircraft 1114. The method 1100 may further include, based upon the received aircraft navigation information, generating a second depiction, the second depiction including the speed cue 1116. The method 1100 may further include displaying the second depiction 1118.

In further embodiments, the method 1100 may further include receiving updated aircraft navigation information for the aircraft 1120. The method 1100 may further include, based upon the received updated aircraft navigation information, determining an updated predicted time of arrival at the assigned RTA clearance location for the aircraft 1122. The method 1100 may further include, based upon the updated predicted time of arrival at the assigned RTA clearance location, updating the time cue, the updated time cue indicating an updated predicted arrival status of the aircraft relative to the assigned RTA clearance time for the aircraft 1124. The method 1100 may further include, based upon the updated received aircraft navigation information, generating an updated first depiction, the updated first depiction including the updated time cue 1126. The method 1100 may further include displaying the updated first depiction 1128.

In additional embodiments, the method 1100 may further include, based upon the received updated aircraft navigation information, determining an updated prescribed speed value/an updated prescribed range of speed values for the aircraft for promoting arrival of the aircraft at the assigned RTA clearance time for the aircraft and at the assigned RTA clearance location for the aircraft 1130. The method 1100 may further include, based upon at least one of: the updated prescribed speed value and the updated prescribed range of speed values, updating the speed cue, the updated speed cue indicating at least one of the updated prescribed speed value and the updated prescribed range of speed values 1132. The method 1100 may further include, based upon the updated received aircraft navigation information, generating an updated second depiction, the updated second depiction including the updated speed cue 1134. The method 1100 may further include displaying the updated second depiction 1136.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A flight deck situational awareness system for displaying Required Time of Arrival (RTA) information for an aircraft, comprising:

a memory configured for storing aircraft navigation information for the aircraft, the memory implemented on the aircraft, the aircraft navigation information including a position of the aircraft, a performance of the aircraft, an environment of the aircraft, an approach path of the aircraft, a landing area of the aircraft, and terrain information associated with the aircraft;

a processor implemented on the aircraft, the processor configured for being communicatively coupled with the memory and further configured for:

receiving the aircraft navigation information stored in the memory;

receiving an assigned RTA clearance time for an assigned RTA clearance location for the aircraft and an assigned RTA clearance window for the assigned RTA clearance location for the aircraft, the assigned RTA clearance window including the assigned RTA clearance time, the assigned RTA clearance time received from an air traffic control; and based at least upon the aircraft navigation information and the assigned RTA clearance time, generating at least one graphical depiction including a plurality of predictive indicators indicative of whether the aircraft is predicted to reach the assigned RTA clearance location within the assigned RTA clearance window, a vertical RTA flight profile for the aircraft, an airspeed indicator for the aircraft, a vertical speed indicator (VSI) for the aircraft, a minimum vertical descent speed vector, and a maximum vertical descent speed vector, the plurality of predictive indicators including a first speed cue positioned on the airspeed indicator, a second speed cue positioned on the vertical speed indicator, and a time cue, the time cue depicting the assigned RTA clearance time relative to a current time status of the aircraft, the airspeed indicator for the aircraft being a speed tape graphical indicator; and a display implemented on the aircraft, the display being communicatively coupled with the processor, the display being configured for:

receiving data associated with the at least one graphical depiction including the plurality of predictive indicators, the vertical RTA flight profile, the airspeed indicator, the vertical speed indicator, the minimum vertical descent speed vector, and the maximum vertical descent speed vector from the processor; and displaying the at least one graphical depiction including the plurality of predictive indicators, the vertical RTA flight profile, the airspeed indicator, the vertical speed indicator, the minimum vertical descent speed vector, and the maximum vertical descent speed vector to a pilot, the time cue indicating that the aircraft is projected to arrive at the assigned RTA clearance location outside of the assigned RTA clearance window, the first speed cue indicating on the airspeed indicator a prescribed range of speed values for the aircraft to arrive at the assigned RTA clearance time and at the assigned RTA clearance location, the second speed cue indicating on the vertical speed indicator a prescribed range of vertical speed values for the aircraft to arrive at the assigned RTA clearance time and at the assigned RTA clearance location, wherein each of the minimum vertical descent speed vector and the maximum vertical descent speed vector is graphically depicted as a line.

2. A flight deck situational awareness system as claimed in claim 1, wherein the vertical RTA flight profile for the aircraft is at least one of an ascent profile and a descent profile.

3. A flight deck situational awareness system as claimed in claim 1, wherein the system is further configured for dynamically updating the plurality of predictive indicators in real time based upon updated aircraft navigation information for the aircraft.

4. A method for providing Required Time of Arrival (RTA) information for an aircraft via a flight deck situational awareness system of the aircraft, comprising:

storing, in a memory implemented on the aircraft, aircraft navigation information for the aircraft, the aircraft navigation information including a position of the aircraft, a performance of the aircraft, an environment of the aircraft, an approach path of the aircraft, a landing area of the aircraft, and terrain information associated with the aircraft;

receiving, by a processor implemented on the aircraft, the aircraft navigation information;

receiving, by the processor, an assigned RTA clearance time and an assigned RTA clearance window for an assigned RTA clearance location, the assigned RTA clearance window including the assigned RTA clearance time, the assigned RTA clearance time received from an air traffic control, the processor communicatively coupled to the memory;

based at least upon the aircraft navigation information and the assigned RTA clearance time, generating, by the processor, at least one graphical depiction including a plurality of predictive indicators indicative of whether the aircraft is predicted to reach the assigned RTA clearance location within the assigned RTA clearance window, a vertical RTA flight profile for the aircraft, an airspeed indicator for the aircraft, a vertical speed indicator (VSI) for the aircraft, a minimum vertical descent speed vector, and a maximum vertical descent speed vector, the plurality of predictive indicators including a first speed cue positioned on the airspeed indicator, a second speed cue positioned on the vertical speed indicator, and a time cue, the time cue depicting the assigned RTA clearance time relative to a current time status of the aircraft, the airspeed indicator for the aircraft being a speed tape graphical indicator;

receiving, by a flight deck display of the aircraft, data associated with the at least one graphical depiction including the plurality of predictive indicators, the vertical RTA flight profile, the airspeed indicator, the vertical speed indicator, the minimum vertical descent speed vector, and the maximum vertical descent speed vector from the processor; and displaying, by the flight deck display, the at least one graphical depiction including the plurality of predictive indicators, the vertical RTA flight profile, the airspeed indicator, the vertical speed indicator, the minimum vertical descent speed vector, and the maximum vertical descent speed vector to a pilot, the time cue indicating that the aircraft is projected to arrive at the assigned RTA clearance location outside of the assigned RTA clearance window, the first speed cue indicating on the airspeed indicator a prescribed range of speed values for the aircraft to arrive at the assigned RTA clearance time and at the assigned RTA clearance location, the second speed cue indicating on the vertical speed indicator a prescribed range of vertical speed values for the aircraft to arrive at the assigned RTA clearance time and at the assigned RTA clearance location, wherein each of the minimum vertical descent speed vector and the maximum vertical descent speed vector is graphically depicted as a line.

5. A method as claimed in claim 4, further comprising:
based upon the received aircraft navigation information, determining a prescribed range of speed values for the aircraft for promoting arrival of the aircraft at the assigned RTA clearance time and at the assigned RTA clearance location.

6. A method as claimed in claim 4, further comprising:
receiving updated aircraft navigation information for the aircraft.

7. A method as claimed in claim 6, further comprising:
based at least upon the received updated aircraft navigation information, determining an updated predicted time of arrival at the assigned RTA clearance location for the aircraft.

8. A method as claimed in claim 7, further comprising:
based at least upon the updated predicted time of arrival at the assigned RTA clearance location, updating the plurality of predictive indicators including the time cue, the updated time cue indicating an updated predicted arrival status of the aircraft relative to the assigned RTA clearance time for the aircraft;
based at least upon the updated received aircraft navigation information and the updated plurality of predictive indicators, generating at least one updated depiction including the updated plurality of predictive indicators; and
displaying at least one updated depiction including the updated plurality of predictive indicators.

9. A method as claimed in claim 6, further comprising:
based upon the received updated aircraft navigation information, determining updated prescribed ranges of speed values for the aircraft for promoting arrival of the aircraft at the assigned RTA clearance time and at the assigned RTA clearance location.

10. A method as claimed in claim 9, the method further comprising:
based at least upon the updated prescribed ranges of speed values, updating the first speed cue and the second speed cue, the updated first speed cue and the updated second speed cue indicating the updated prescribed ranges of speed values;
based at least upon the updated received aircraft navigation information, generating at least one updated depiction including an updated plurality of predictive indicators including the updated first speed cue and the updated second speed cue; and
displaying the at least one updated depiction including the updated plurality of predictive indicators including the updated first speed cue and the updated second speed cue.

11. A computer-readable medium having non-transitory computer readable code embodied therein, the non-transitory computer readable code comprising instructions which, when executed by a computer device processor, perform a method for providing Required Time of Arrival (RTA) information for an aircraft via a flight deck situational awareness system of the aircraft, said method comprising:
receiving, by the computer device processor implemented on the aircraft, aircraft navigation information for the aircraft, the aircraft navigation information including a position of the aircraft, a performance of the aircraft, an environment of the aircraft, an approach path of the aircraft, a landing area of the aircraft, and terrain information associated with the aircraft;
receiving, by the computer device processor, an assigned RTA clearance time for an assigned RTA clearance location for the aircraft and an assigned RTA clearance window for the assigned RTA clearance location for the aircraft, the assigned RTA clearance window including the assigned RTA clearance time, the assigned RTA clearance time received from an air traffic control;
based at least upon the aircraft navigation information and the assigned RTA clearance time, generating, by the computer device processor, at least one graphical depiction including a plurality of predictive indicators indicative of whether the aircraft is predicted to reach the assigned RTA clearance location within the assigned RTA clearance window, a vertical RTA flight profile for the aircraft, an airspeed indicator for the aircraft, a vertical speed indicator (VSI) for the aircraft, a minimum vertical descent speed vector, and a maximum vertical descent speed vector, the plurality of predictive indicators including a first speed cue positioned on the airspeed indicator, a second speed cue positioned on the vertical speed indicator, and a time cue, the time cue depicting the assigned RTA clearance time relative to a current time status of the aircraft, the airspeed indicator for the aircraft being a speed tape graphical indicator; and
outputting, by the computer device processor, data associated with the at least one graphical depiction including the plurality of predictive indicators, the vertical RTA flight profile, the airspeed indicator, the vertical speed indicator, the minimum vertical descent speed vector, and the maximum vertical descent speed vector from the processor,
wherein, based at least on a reception of the data associated with the at least one graphical depiction, the flight deck display is configured to display the at least one graphical depiction including the plurality of predictive indicators, the vertical RTA flight profile, the airspeed indicator, the vertical speed indicator, the minimum vertical descent speed vector, and the maximum vertical descent speed vector to a pilot, the time cue indicating that the aircraft is projected to arrive at the assigned RTA clearance location outside of the assigned RTA clearance window, the first speed cue indicating on the airspeed indicator a prescribed range of speed values for the aircraft to arrive at the assigned RTA clearance time and at the assigned RTA clearance location, the second speed cue indicating on the vertical speed indicator a prescribed range of vertical speed values for the aircraft to arrive at the assigned RTA clearance time and at the assigned RTA clearance location, wherein each of the minimum vertical descent speed vector and the maximum vertical descent speed vector is graphically depicted as a line.

* * * * *